United States Patent
Zettel et al.

(10) Patent No.: US 7,848,902 B2
(45) Date of Patent: Dec. 7, 2010

(54) METHOD AND APPARATUS FOR MONITORING A THERMAL MANAGEMENT SYSTEM OF AN ELECTRO-MECHANICAL TRANSMISSION

(75) Inventors: Andrew M. Zettel, Ann Arbor, MI (US); Charles J Van Horn, Novi, MI (US); Peter E. Wu, Brighton, MI (US); Ryan D Martini, Royal Oak, MI (US); Wei D. Wang, Troy, MI (US); Stephen T. West, New Palestine, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 513 days.

(21) Appl. No.: 11/870,022

(22) Filed: Oct. 10, 2007

(65) Prior Publication Data

US 2009/0099791 A1  Apr. 16, 2009

(51) Int. Cl.
*G01K 17/00* (2006.01)
*G01K 3/00* (2006.01)
*G01K 7/00* (2006.01)
*G01K 13/00* (2006.01)
*G01R 21/00* (2006.01)

(52) U.S. Cl. .................. 702/136; 702/60; 702/99; 702/130; 701/22; 123/41.05; 123/254; 123/406.55; 123/686; 123/689

(58) Field of Classification Search ............. 702/136, 702/60, 99, 130; 123/254; 701/22
See application file for complete search history.

(56) References Cited

U.S. PATENT DOCUMENTS

| | | | |
|---|---|---|---|
| 5,931,140 A * | 8/1999 | Maloney ................ 123/480 |
| 6,219,245 B1 | 4/2001 | Nagashima et al. | |
| 6,313,991 B1 | 11/2001 | Nagashima et al. | |
| 6,366,838 B1 * | 4/2002 | Yoshino et al. ............ 701/22 |
| 6,560,970 B1 * | 5/2003 | Swift .................... 62/6 |
| 7,104,080 B2 * | 9/2006 | Albertson ............. 62/259.2 |
| 7,624,632 B1 * | 12/2009 | Hoyle et al. ........... 73/204.11 |
| 2005/0150209 A1 * | 7/2005 | Kesch et al. ............ 60/277 |
| 2006/0174642 A1 | 8/2006 | Nagashima et al. | |

* cited by examiner

*Primary Examiner*—Jeffrey R West
*Assistant Examiner*—Janet L Suglo

(57) ABSTRACT

Temperature of an electric power device of a hybrid transmission is managed based upon device temperatures and power flow, ambient temperature, and a cooling circuit flow rate.

12 Claims, 3 Drawing Sheets

METHOD AND APPARATUS FOR MONITORING A THERMAL MANAGEMENT SYSTEM OF AN ELECTRO-MECHANICAL TRANSMISSION

TECHNICAL FIELD

This disclosure is related to control systems for electro-mechanical transmissions, and thermal management systems therefore.

BACKGROUND

The statements in this section merely provide background information related to the present disclosure and may not constitute prior art.

Powertrain architectures comprise torque-generative devices, including internal combustion engines and electric machines, which transmit torque through a transmission device to an output. One exemplary transmission is a two-mode, compound-split, electro-mechanical transmission which utilizes an input member for receiving motive torque from a prime mover power source, for example an internal combustion engine, and an output member for delivering motive torque from the transmission to a vehicle driveline. Electric machines, operable as motors or generators, generate a torque input to the transmission, independently of a torque input from the internal combustion engine. The electric machines may transform vehicle kinetic energy, transmitted through the vehicle driveline, to electrical energy potential that is storable in the electrical energy storage device. A control system monitors various inputs from the vehicle and the operator and provides operational control of the powertrain system, including controlling transmission operating state and gear shifting, controlling the torque-generative devices, and regulating the electrical power interchange between the electrical energy storage device and the electric machines.

During operation of the electric machines, heat is generated in the various electric power devices, including the electric machines, power inverters, and electrical energy storage devices, e.g., high voltage batteries. Heat transfer devices, including heat sinks, heat exchangers, and cooling systems may be incorporated to manage waste heat in the system. Systems include closed-circuit cooling systems which flow liquid coolant over heat sinks and pump the coolant through a heat exchanger to remove the waste heat. Other systems include fan devices which pass air over the heat sink devices to remove heat therefrom.

SUMMARY

A method for thermal management of an electric power device includes monitoring temperature of the electric power device and an ambient temperature and determining an electric power flow through the electric power device. A temperature gradient across the electric power device based upon the monitored temperature of the electric power device is determined. A flow rate through the heat transfer circuit is estimated and compared to a threshold flow rate based upon the temperature gradient, the ambient temperature, and the electric power flow.

BRIEF DESCRIPTION OF THE DRAWINGS

One or more embodiments will now be described, by way of example, with reference to the accompanying drawings, in which.

DETAILED DESCRIPTION

Figure 1:
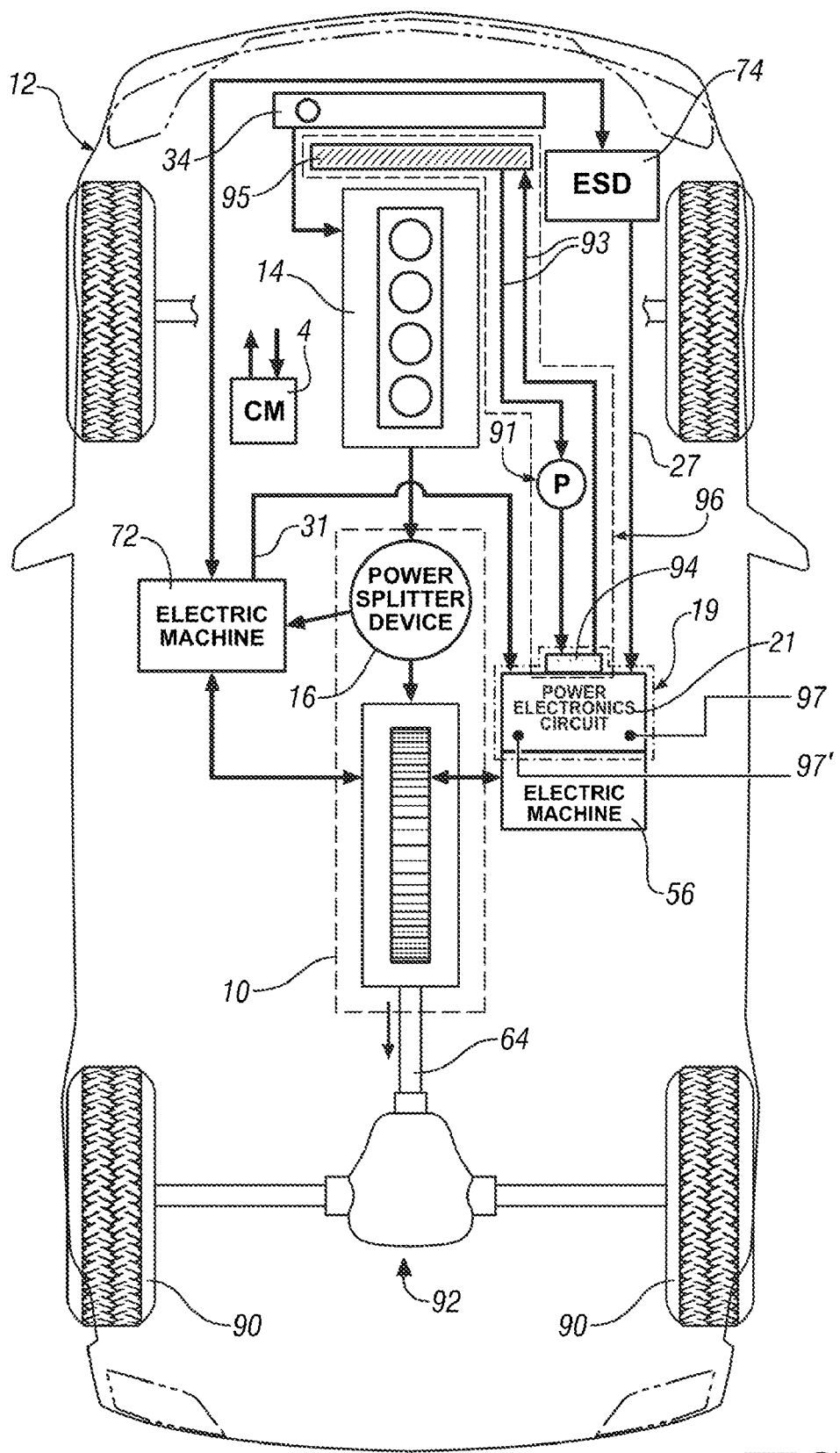
FIG. 1 is a schematic diagram of an exemplary powertrain, in accordance with the present disclosure.

Referring now to the drawings, wherein the showings are for the purpose of illustrating certain exemplary embodiments only and not for the purpose of limiting the same, FIG. 1 depicts a vehicle system 12 which has been constructed in accordance with an embodiment of the present disclosure. The vehicle system 12 comprises an internal combustion engine 14, electro-mechanical transmission 10, and driveline 92 adapted to transmit tractive torque to vehicle wheels 90. An electric power system comprises electric power components or devices including respective first and second electric machines 56 and 72, an electrical energy storage device ('ESD') 74, and power electronics circuit 19. The electric machines 56 and 72 comprise motor/generators, each of which converts electric power to mechanical torque via the power electronics circuit 19. The ESD 74 comprises a high-voltage battery system adapted to store electrical energy and transmit electrical power to the electric machines 56 and 72 via the power electronics circuit 19. The ESD 74 and electric machines 56 and 72 are electrically-operatively coupled for electric power flow therebetween. The engine 14, electric machines 56, 72, and the electro-mechanical transmission 10 are mechanically-operatively coupled to transmit mechanical power therebetween to transmit motive torque to the driveline 92 and vehicle wheels 90 via output shaft 64, and to transmit mechanical power to one of the electric machines 56 and 72 for electric power generation via a power splitting device 16. A distributed control module ('CM') 4 is adapted to monitor inputs from a plurality of sensing devices (not shown) and execute predetermined algorithms stored therein to control actuators of the various devices to achieve an operator torque request and meet other parameters related to performance, fuel economy, and emissions, among others. The exemplary hybrid powertrain system is configured to execute the control schemes depicted hereinbelow with reference to FIGS. 2 and 3, among various others required for operation of the vehicle system 12.

The exemplary engine 14 comprises a multi-cylinder internal combustion engine selectively operative in several states to transmit torque to the transmission 10, and can be either a spark-ignition or a compression-ignition engine. The transmission 10 comprises an electro-mechanical torque-transmitting device. The exemplary electro-mechanical transmission 10 operates in one of several operating range states comprising fixed gear operation and continuously variable operation.

The first and second electric machines 56 and 72 comprise three-phase AC machines and include a stator, a rotor, and a resolver assembly, all not shown. The motor stator for each machine is grounded to an outer portion of the transmission case, and includes a stator core with coiled electrical windings extending therefrom. Each resolver assembly comprises a variable reluctance device including a resolver stator, operatively connected to the stator for each electric machine 56 and 72, and a resolver rotor, operatively connected to the rotor for each electric machine 56 and 72 described above. Each resolver comprises a sensing device adapted to sense rotational position of the resolver stator relative to the resolver rotor, and identify the rotational position.

The transmission 10 receives engine input torque from the torque-generative devices, including the engine 14 and first electric machine 56 and second electric machine 72, as a result of energy conversion from fuel or electrical potential stored in the ESD 74. The ESD 74 is high voltage DC-coupled to a power electronics circuit 19 via DC transfer conductors 27. Electrical power, measurable in current and voltage, is transmitted to and from the ESD 74 in accordance with whether the ESD 74 is being charged or discharged.

The power electronics circuit 19 is an element of the vehicle system 12 and comprises a pair of complementary three-phase power inverter modules (not shown) adapted to transmit electric power to and from the electric machines 56 and 72 via transfer conductors 31, one of which is shown in FIG. 1. The power inverter modules of the power electronics circuit 19 each preferably comprises a plurality of semiconductor power switching devices, e.g., insulated gate bipolar transistors ('IGBTs') forming a switch mode power supply, and respective motor control modules configured to receive motor control commands and control inverter states therefrom to provide motor drive or electric power regeneration functionality. The power inverter modules receive DC electric power and transform it to three-phase AC power which is conducted to the electric machines 56 and 72 for operation thereof.

A heat transfer circuit 96 preferably comprises a closed fluidic circuit including a heat transfer or fluid/air radiator device 95 that is preferably separate from a main vehicle radiator 34 used for cooling the engine 14. However those skilled in the art will recognize that the fluid air radiator device 95 may be incorporated within the main vehicle radiator 34 while remaining within the scope of that which is claimed. The fluid/air radiator device 95 is fluidly connected to, and forms a fluid circuit with, a thermal interface device 94 of the power electronics circuit 19 via coolant lines 93. A pump device 91, such as an electrically actuated pump, pumps or circulates fluid, e.g., an ethylene glycol based coolant, within the heat transfer circuit 96. The pump device 91 preferably comprises a variable flow device having a flow rate controlled via a pulsewidth-modulated electric circuit. Operation of the pump device 91, and therefore pump flow rate, is preferably controlled via a pulsewidth-modulated (PWM) signal output from the control module 4 as a function of operating conditions, e.g., temperature measured at the inverter, ambient temperature and electrical load. The high-voltage ESD 74 and the stators of the electric machines 56 and 72 include the thermal interface device 94 that connects to the heat transfer circuit 96, or, alternatively, are on separate cooling circuits. The thermal interface device 94 preferably comprises a heat exchange device thermally connected to a coolant manifold (not shown). The power electronics circuit 19 includes a multi-sectioned housing (not shown in detail) having an electrical connection for feedthrough of power, control and data cables in a first section 21, and a fluidic connection for feedthrough of liquid coolant to the coolant manifold of the thermal interface device 94 in a second section. The first section 21 of the housing contains the plurality of semiconductor power switching devices (e.g., the IGBTs), not shown. Each of the semiconductor power switching devices is thermally coupled to the thermal interface device 94. The thermal interface device 94 preferably comprises a fin-type radiant heat exchanger located in the housing in a manner that the fins are exposed in the coolant manifold of the second section, while the power switching devices are fluidly sealed therefrom, preventing exposing the power switching devices to the coolant fluid. There are other electronic devices in the housing, including a plurality of temperature sensing devices 97 and 97' and electrical current sensing devices. The temperature sensors 97 and 97' each monitor one of the plurality of semiconductor power switching devices to determine temperature states thereof, referred to hereinbelow as $T_{N\_IGBT}$, with N indicating the specific semiconductor power switching devices. Signal outputs of the temperature sensors 97 and 97' are input to the control module 4 for analysis. The second section of the housing comprises the thermal interface device 94, consisting of the fin-type radiant heat exchanger and the coolant manifold fluidly sealed in the second section of the housing. The second section of the housing includes a fluidic inlet and outlet, and the coolant manifold comprises a fluidic passage which exposes the fin-type radiant heat exchanger to coolant fluid.

The volume and frontal area of the fluid/air radiator device 95 and the flow capacity of the pump device 91 are determined based upon the amount of heat rejection from the power electronics circuit 19 through the thermal interface device 94. The fluid/air radiator device 95 is sized such that the heat generation of the power electronics circuit 19 operating at a low electrical efficiency point is less than system heat rejection through the fluid/air radiator device 95 at a maximum ambient temperature, e.g., 35-40° C.

The control module 4 comprises a distributed control module architecture which provides coordinated system control of the powertrain system described herein, and is a subset of an overall vehicle control architecture. The control module 4 synthesizes pertinent information and inputs, and executes algorithms to control various actuators to achieve control targets, including such parameters as fuel economy, emissions, performance, derivability, and protection of hardware, including batteries contained within the ESD 74 and the first and second electric machines 56 and 72. The distributed architecture preferably includes an engine control module, transmission control module, battery pack control module, the power electronics circuit 19, and a hybrid control module, which provides supervisory control and coordination of the aforementioned control modules. A user interface, not shown, is operatively connected to a plurality of devices through which a vehicle operator typically controls or directs operation of the powertrain including the transmission 10. Such operator driven control signals may include an operator torque request and operator brake. Exemplary input devices to the user interface include an accelerator pedal, a brake pedal, a transmission gear selector, and a vehicle speed cruise control, all of which are not shown. Each of the aforementioned control modules communicates with other control modules, sensors, and actuators via a local area network which allows for structured communication of control parameters and commands between the various control modules.

Each of the control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using a local area network communications bus. Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

A computer program is executed in the control module 4 to monitor the temperature sensing devices 97 and 97', ambient temperature, and electric power flow through one or more electric power components or devices. The electric power devices comprise one of the power electronics circuit 19 (having temperature $T_{IGBT\_N}$ for N temperature sensors), the motor stator of one of the electric machines 56 and 72, and the ESD 74. A temperature gradient across the electric power component is determined based upon input from the monitored temperature sensing devices. A flow rate through the heat transfer circuit 96 is estimated based upon the temperature gradient, the ambient temperature, and the electric power flow. The estimated flow rate through the heat transfer circuit 96 is compared to a threshold flow rate. Embodiments of this are now described in detail with reference to FIGS. 2 and 3 and with continued reference to FIG. 1.

Figure 2:
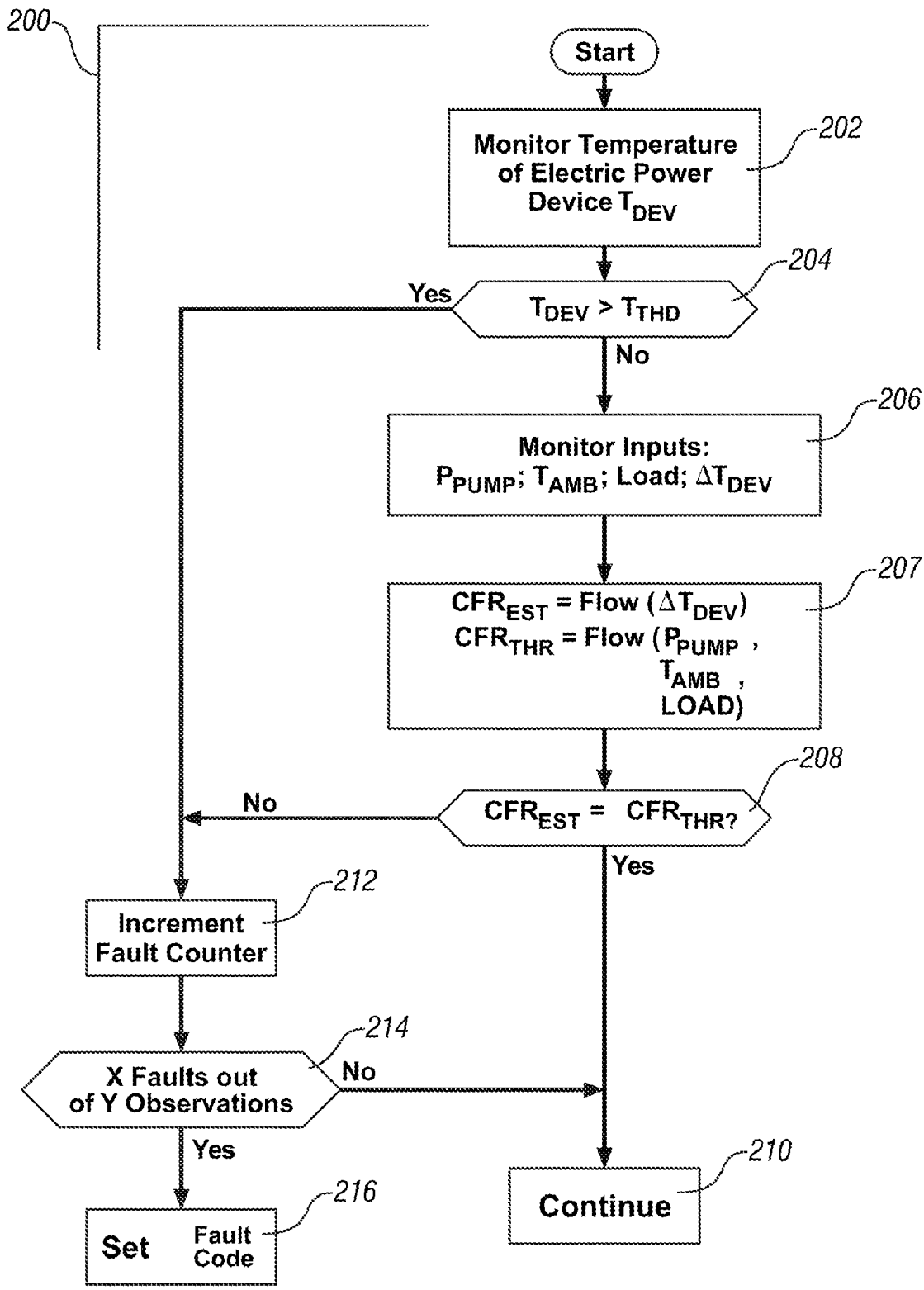
FIGS. 2 and 3 are algorithmic flowcharts, in accordance with the present disclosure.

FIG. 2 depicts a first embodiment, comprising control scheme 200, executable as program code in the control module 4 preferably during one of the loop cycles. Temperature(s) of one of the electric power devices is monitored. In the present embodiment of FIG. 2, the electric power device monitored is the power electronics circuit 19 which is preferably monitored in a plurality of locations using temperature sensors 97 and 97'. The motor stator of one of the electric machines 56 and 72, and the ESD 74 may be similarly monitored. A device temperature ($T_{DEV}$) is determined to be the maximum of the plurality of monitored temperatures, or, alternatively, some calculated average of the plurality of monitored temperature (Step 202).

The temperature of the device ($T_{DEV}$) is compared to a predetermined upper threshold temperature ($T_{THD}$) (Step 204). When the temperature of the device is less than the predetermined upper threshold temperature, inputs from the coolant circuit are monitored (Step 206), including electric power to the pump 91 ($P_{PUMP}$), typically the commanded PWM duty cycle, the ambient temperature ($T_{AMB}$), and the electrical load (LOAD). A temperature gradient across the electric power device is also determined ($\Delta T_{DEV}$), comprising a temperature difference between a maximum output from one of the temperature sensors 97 or 97' on the device and a minimum output from one of the temperature sensors 97 or 97' on the device, at a given point in time. A first coolant flow rate is estimated, comprising a precalibrated coolant flow rate determined based upon the temperature gradient across the device, depicted as $CFR_{EST}$. A calibration array for the first precalibrated coolant flow rate $CFR_{EST}$ is preferably generated during testing of the system described, and stored as an array in one of the memory devices of the control module 4. A second, threshold coolant flow rate is determined, referred to as $CFR_{THR}$, and comprises a precalibrated flow which is determined based upon the electric power to the pump 91 ($P_{PUMP}$), the ambient temperature ($T_{AMB}$), and the electrical load (LOAD) (step 207). The first and second flow rates $CFR_{EST}$ and $CFR_{THR}$, respectively, are compared (Step 208). When the first and second flow rates, $CFR_{EST}$ and $CFR_{THR}$, are substantially the same, with allowance for measurement errors and other sources of variation, operation of the system continues (Step 210). When the first and second flow rates, $CFR_{EST}$ and $CFR_{THR}$, vary by an amount greater than allowable measurement error (Step 208), or the temperature of the electric power device $T_{DEV}$ is greater than the predetermined upper threshold temperature $T_{THD}$ (from Step 204), a fault counter is incremented (Step 212). A fault code is set when there are X faults out of Y observations, i.e., executions of the algorithm in the loop cycle (Steps 214, 216). Depending upon the conditions and requirements, the operator of the vehicle is notified of the presence of a fault in the heat transfer circuit 96, and the control module 4 executes a mitigating action to prevent further harm or damage to the hardware. The mitigating action may include adjusting the PWM control signal to the coolant pump 91 and limiting power output from the electric machines 56 and 72.

Figure 3:
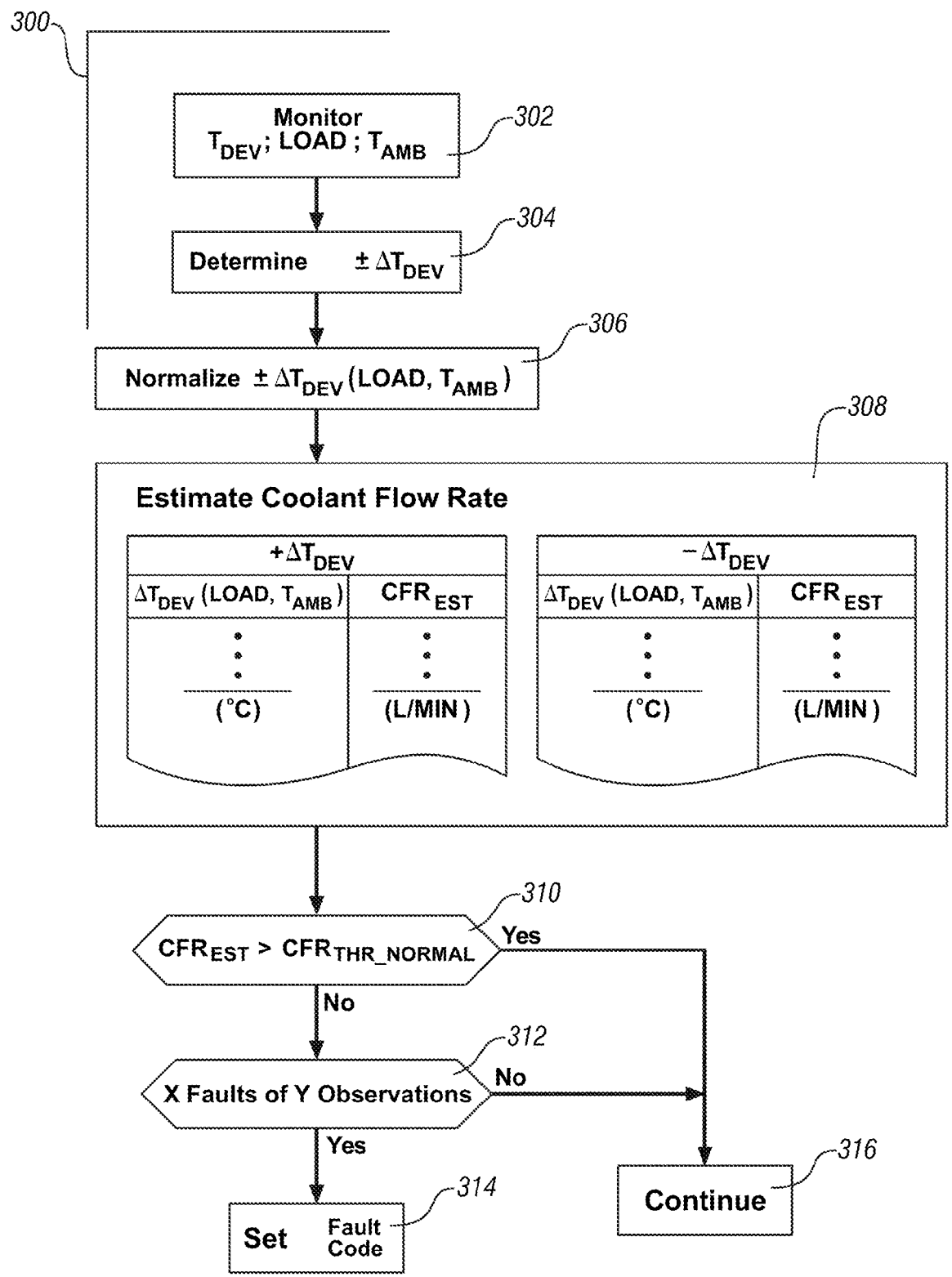

FIG. 3 depicts a second embodiment, comprising control scheme 300 executable as program code in the control module 4 during one of the loop cycles. Temperatures are monitored in the electric power component being cooled, which comprises the power electronics circuit 19 in this embodiment. The power electronics circuit 19 is monitored in N locations to determine temperatures thereof, via temperature sensors 97, 97' located at or near the IGBTs of the power electronics circuit 19. Load (LOAD) and ambient temperature ($T_{AMB}$) are monitored, with load consisting of the power conducted through the power electronics circuit, typically measured as current (I) (Step 302). A temperature gradient across the electric power device ($+/-\Delta T_{DEV}$) is calculated, including both a magnitude and a direction of the gradient (Step 304). The temperature gradient across the electric power device is normalized ($+/-\Delta T_{DEV}$(Load, $T_{AMB}$)), based upon the load and the ambient temperature (Step 306). The normalization removes influences in the temperature gradient that are based upon system load and ambient temperature. An estimate of coolant flow rate ($CFR_{EST}$) is determined based upon the normalized temperature gradient (Step 308). The estimated coolant flow rate is preferably determined based upon two predetermined calibrations. The predetermined calibrations comprise a first calibration when the temperature gradient ($+\Delta T_{DEV}$) across the power electronics circuit is positive, and a second calibration when the temperature gradient ($-\Delta T_{DEV}$) across the power electronics circuit is negative. Each of the predetermined calibrations comprises an array of flow rates ($CFR_{EST}$) corresponding to normalized temperature gradient ($+/-\Delta T_{DEV}$(Load, $T_{AMB}$) determined during system development and testing. The estimated flow rate, $CFR_{EST}$, is compared to a normalized threshold flow rate, $CFR_{THR\_NORMAL}$ (Step 310). The normalized threshold flow rate, $CFR_{THR\_NORMAL}$, preferably comprises a scalar value determined during calibration based upon the PWM control signal to the coolant pump 91. When the estimated flow rate, $CFR_{EST}$, exceeds the normalized threshold flow rate, $CFR_{THR\_NORMAL}$, the control scheme 300 determines the heat transfer circuit 96 is operating as intended, and operation continues (Step 316). When the estimated flow rate, $CFR_{EST}$, does not exceed the normalized threshold flow rate, $CFR_{THR\_NORMAL}$, the control scheme 300 determines the heat transfer circuit 96 is not operating as intended. A fault counter is incremented, and when X faults occur in Y observations, or loops (Step 312), a fault code is set (Step 314). Depending upon the conditions and requirements, the operator of the vehicle is notified of the presence of the fault, and the control module 4 executes mitigating action to prevent further harm or damage to the hardware. The mitigating action may include adjusting the PWM control signal to the coolant pump 91 and limiting power output from the electric machines 56 and 72. In operation, the control system monitors operation of the heat transfer circuit 96 to identify faults therein and mitigate damage to system components.

The system set forth hereinabove described a heat transfer circuit 96 related to the power electronics circuit 19; however, one skilled in the art will readily apply the concepts of the disclosure to monitoring one of the electric machines 56 and 72, or the high-voltage ESD 74.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for thermal management of an electric power device of a hybrid transmission, the method comprising:
   monitoring a plurality of temperatures at a plurality of locations on the electric power device;
   determining a temperature gradient across the electric power device based upon the monitored plurality of temperatures at the plurality of locations on the electric power device;
   estimating a coolant flow rate through a heat transfer circuit including a thermal interface device thermally coupled to the electric power device based upon the temperature gradient across the electric power device;
   comparing the estimated coolant flow rate to a threshold coolant flow rate; and
   adjusting at least one of the coolant flow rate through the heat transfer circuit and an electric power flow through the electric power device when the estimated coolant flow rate varies from the threshold coolant flow rate.

2. The method of claim 1, wherein the threshold coolant flow rate is determined based upon the electric power flow through the electric power device.

3. The method of claim 1, further comprising monitoring an ambient temperature and an electric power to a pump providing the coolant flow through the heat transfer circuit, wherein the threshold coolant flow rate is determined based upon the electric power flow through the electric power device, the ambient temperature and the electric power to the pump.

4. The method of claim 1, further comprising monitoring an ambient temperature, wherein the temperature gradient across the electric power device comprises a magnitude and a direction, and wherein estimating the coolant flow rate through the heat transfer circuit based upon the temperature gradient across the electric power device comprises:
   normalizing the temperature gradient across the electric power device based upon the ambient temperature and the electric power flow through the electric power device; and
   determining a coolant flow rate from a precalibrated array based upon the normalized temperature gradient.

5. The method of claim 1, wherein the electric power device comprises a power electronics circuit operative to control the electric power flow between an electric machine of the hybrid transmission and an electrical energy storage device.

6. Article of manufacture, comprising a non-transitory storage medium having a machine-executable program encoded therein to monitor a closed fluidic heat transfer circuit for an electric power device of an electro-mechanical transmission system, the program comprising:
   code to monitor a plurality of temperatures at a plurality of locations on the electric power device;
   code to determine a temperature gradient of the electric power device based upon the monitored plurality of temperatures at the plurality of locations on the electric power device;
   code to estimate a coolant flow rate through the heat transfer circuit including a thermal interface device thermally coupled to the electric power device based upon the temperature gradient across the electric power device;
   code to compare the estimated fluidic flow rate to a threshold coolant flow rate; and
   code to adjust at least one of the coolant flow rate through the heat transfer circuit and an electric power flow through the electric power device when the estimated coolant flow rate varies from the threshold coolant flow rate.

7. The article of claim 6, further comprising:
   code to determine the threshold coolant flow rate based upon the electric power flow through the electric power device.

8. The article of claim 7, further comprising code to monitor an ambient temperature, wherein the temperature gradient across the electric power device comprises a magnitude and a direction, and wherein the code to estimate the coolant flow rate through the heat transfer circuit based upon the temperature gradient of the electric power device further comprises:
   code to normalize the temperature gradient across the electric power device based upon the ambient temperature and the electric power flow through the electric power device; and
   code to determine a coolant flow rate from a precalibrated array based upon the normalized temperature gradient.

9. The article of claim 6, wherein the electric power device comprises a power electronics circuit operative to control the electric power flow between an electric machine of the electro-mechanical transmission and an electrical energy storage device.

10. Electro-mechanical transmission system, comprising:
   an electro-mechanical transmission mechanically-operatively coupled to an internal combustion engine and an electric machine to transmit mechanical power flow to an output shaft;
   an electric power system comprising an energy storage device electrically-operatively coupled to the electric machine via a power electronics circuit, said electric power system including a thermal interface device;
   a plurality of temperature sensors operative to monitor temperature of an electric power device and ambient temperature;
   a heat transfer circuit, fluidly connected to the thermal interface device and operative to manage heat transfer therewith; and
   a control module, signally connected to the temperature sensors and having a machine-executable program encoded therein, the program comprising:
      code to monitor temperature of the electric power device and an ambient temperature;
      code to determine an electric power flow through the electro-mechanical transmission system;
      code to determine a temperature gradient of the electric power device based upon the monitored temperature of the electric power device;
      code to estimate and compare a flow rate through the heat transfer circuit to a threshold flow rate based upon the temperature gradient, the ambient temperature, and the electric power flow through the electro-mechanical transmission system; and code to identify a fault in the heat transfer circuit when the estimated flow rate through the heat transfer circuit is not substantially the same as the threshold flow rate.

11. Electro-mechanical transmission system, comprising:
an electro-mechanical transmission mechanically-operatively coupled to an internal combustion engine and an electric machine to transmit mechanical power flow to an output shaft;
an electric power system comprising an energy storage device electrically-operatively coupled to the electric machine via a power electronics circuit, said electric power system including a thermal interface device;
a plurality of temperature sensors operative to monitor temperature of an electric power device and ambient temperature;
a heat transfer circuit, fluidly connected to the thermal interface device and operative to manage heat transfer therewith; and
a control module, signally connected to the temperature sensors and having a machine-executable program encoded therein, the program comprising:
 code to monitor temperature of the electric power device and an ambient temperature;
 code to determine an electric power flow through the electro-mechanical transmission system;
 code to determine a temperature gradient of the electric power device based upon the monitored temperature of the electric power device;
 code to estimate a flow rate through the heat transfer circuit based upon the temperature gradient of the electric power device;
 code to determine a threshold flow rate based upon the electric power flow through the electric power device;
 code to estimate and compare the flow rate through the heat transfer circuit to the threshold flow rate based upon the temperature gradient, the ambient temperature, and the electric power flow through the electro-mechanical transmission system; and
 code to identify a fault in the heat transfer circuit when the estimated flow rate through the heat transfer circuit is not substantially the same as the threshold flow rate.

12. Electro-mechanical transmission system, comprising:
an electro-mechanical transmission mechanically-operatively coupled to an internal combustion engine and an electric machine to transmit mechanical power flow to an output shaft;
an electric power system comprising an energy storage device electrically-operatively coupled to the electric machine via a power electronics circuit, said electric power system including a thermal interface device;
a plurality of temperature sensors operative to monitor temperature of an electric power device and ambient temperature;
a heat transfer circuit comprising a fluidly closed circuit including a thermal interface device, a pump, and a heat transfer device, said heat transfer circuit fluidly connected to the thermal interface device and operative to manage heat transfer therewith; and
a control module, signally connected to the temperature sensors and having a machine-executable program encoded therein, the program comprising:
 code to monitor temperature of the electric power device and an ambient temperature;
 code to determine an electric power flow through the electro-mechanical transmission system;
 code to determine a temperature gradient of the electric power device based upon the monitored temperature of the electric power device;
 code to estimate and compare a flow rate through the heat transfer circuit to a threshold flow rate based upon the temperature gradient, the ambient temperature, and the electric power flow through the electro-mechanical transmission system; and
 code to identify a fault in the heat transfer circuit when the estimated flow rate through the heat transfer circuit is not substantially the same as the threshold flow rate.

* * * * *